(12) United States Patent  
Powell et al.

(10) Patent No.: US 9,405,285 B2
(45) Date of Patent: Aug. 2, 2016

(54) INTERFACE FOR LOCAL CONFIGURATION AND MONITORING OF AN INDUSTRIAL FIELD DEVICE WITH SUPPORT FOR PROVISIONING ONTO AN INDUSTRIAL WIRELESS NETWORK AND RELATED SYSTEM AND METHOD

(75) Inventors: Robert Powell, Furlong, PA (US); Narendra Kulkarni, Pune (IN); Usha Kuloor, North Wales, PA (US); Apurva Pathak, Pune (IN)

(73) Assignee: Honeywell International Inc., Morris Plains, NJ (US)

( * ) Notice: Subject to any disclaimer, the term of this patent is extended or adjusted under 35 U.S.C. 154(b) by 700 days.

(21) Appl. No.: 13/355,336

(22) Filed: Jan. 20, 2012

(65) Prior Publication Data

US 2012/0236769 A1 Sep. 20, 2012

Related U.S. Application Data

(60) Provisional application No. 61/454,192, filed on Mar. 18, 2011.

(51) Int. Cl.
*G05B 19/042* (2006.01)

(52) U.S. Cl.
CPC .. *G05B 19/0426* (2013.01); *G05B 2219/23406* (2013.01); *G05B 2219/24028* (2013.01); *G05B 2219/25092* (2013.01); *G05B 2219/25428* (2013.01)

(58) Field of Classification Search
CPC ....................................................... H04L 12/26
See application file for complete search history.

(56) References Cited

U.S. PATENT DOCUMENTS 5,027,288 A 6/1991 Suzuki et al.
5,361,336 A 11/1994 Atchison (Continued)

FOREIGN PATENT DOCUMENTS

KR 1020050077105 A 8/2005
KR 1020090010515 A 1/2009
WO WO 2009/154599 A1 12/2009

OTHER PUBLICATIONS

Notification of Transmittal of the International Search Report and the Written Opinion of the International Searching Authority, or the Declaration dated Apr. 27, 2012 in connection with International Patent Application No. PCT/US2012/029338.

(Continued)

*Primary Examiner* — Hassan Phillips
*Assistant Examiner* — Omeed D Rahgozar

(57) ABSTRACT

A method includes communicatively coupling a user device to a field device in an industrial control system in order to configure and provision the field device. The method also includes selecting an operating mode of the user device. The method further includes, in response to selecting a first operating mode, providing configuration data from the user device to the field device in order to configure the field device. In addition, the method includes, in response to selecting a second operating mode, providing provisioning data from the user device to the field device in order to provision the field device onto a wireless network. Providing the configuration data and the provisioning data could include communicating the provisioning data and the configuration data to the field device through an out-of-band communication interface. The out-of-band communication interface may include a direct wired interface or infrared interface.

26 Claims, 5 Drawing Sheets

(56) References Cited

U.S. PATENT DOCUMENTS

| | | | |
|---|---|---|---|
| 5,903,455 | A | 5/1999 | Sharpe, Jr. et al. |
| 6,463,290 | B1 | 10/2002 | Stilp et al. |
| 6,603,977 | B1 | 8/2003 | Walsh et al. |
| 6,782,264 | B2 | 8/2004 | Anderson |
| 7,090,683 | B2 | 8/2006 | Brock et al. |
| 7,167,713 | B2 | 1/2007 | Anderson |
| 7,209,727 | B2 | 4/2007 | Castaneda et al. |
| 7,214,230 | B2 | 5/2007 | Brock et al. |
| 7,371,210 | B2 | 5/2008 | Brock et al. |
| 7,546,125 | B2 | 6/2009 | Sharma et al. |
| 7,567,785 | B2 | 7/2009 | Tsai et al. |
| 7,570,922 | B2 | 8/2009 | Williams |
| 7,654,957 | B2 | 2/2010 | Abreu |
| 7,656,271 | B2 | 2/2010 | Ehrman et al. |
| 7,688,820 | B2 | 3/2010 | Forte et al. |
| 7,701,913 | B2 | 4/2010 | Chen et al. |
| 7,760,905 | B2 | 7/2010 | Rhoads et al. |
| 7,819,859 | B2 | 10/2010 | Prisco et al. |
| 7,852,271 | B2 | 12/2010 | Grunig et al. |
| 7,965,664 | B2 | 6/2011 | Hodson et al. |
| 7,978,062 | B2 | 7/2011 | LaLonde et al. |
| 8,112,565 | B2 | 2/2012 | Russell, III et al. |
| 8,229,576 | B2 | 7/2012 | Kodama et al. |
| 8,307,125 | B2 | 11/2012 | Kodama |
| 8,379,546 | B2 | 2/2013 | Schleiss et al. |
| 8,390,150 | B2 | 3/2013 | Vande Vusse et al. |
| 2001/0038451 | A1 | 11/2001 | Jung et al. |
| 2001/0038453 | A1 | 11/2001 | Jung et al. |
| 2005/0125085 | A1 | 6/2005 | Prasad et al. |
| 2005/0206562 | A1 | 9/2005 | Wilson et al. |
| 2006/0036714 | A1 | 2/2006 | Vuontisjarvi et al. |
| 2006/0238159 | A1 | 10/2006 | Jung |
| 2006/0276143 | A1 | 12/2006 | Anglin |
| 2007/0103324 | A1 | 5/2007 | Kosuge et al. |
| 2007/0123249 | A1 | 5/2007 | Sun |
| 2007/0126576 | A1 | 6/2007 | Script et al. |
| 2007/0243830 | A1 | 10/2007 | Isenmann et al. |
| 2007/0262847 | A1 | 11/2007 | Grabinger et al. |
| 2007/0280178 | A1 | 12/2007 | Hodson et al. |
| 2008/0052039 | A1 | 2/2008 | Miller et al. |
| 2008/0094631 | A1 | 4/2008 | Jung et al. |
| 2008/0155064 | A1 | 6/2008 | Kosuge et al. |
| 2008/0273486 | A1 | 11/2008 | Pratt et al. |
| 2008/0274766 | A1 | 11/2008 | Pratt et al. |
| 2009/0010203 | A1 | 1/2009 | Pratt, Jr. et al. |
| 2009/0010233 | A1 | 1/2009 | Pratt, Jr. et al. |
| 2009/0073423 | A1 | 3/2009 | Jung et al. |
| 2009/0296601 | A1 | 12/2009 | Citrano, III et al. |
| 2009/0311975 | A1 | 12/2009 | Vanderaa et al. |
| 2009/0316628 | A1 | 12/2009 | Enns et al. |
| 2010/0036511 | A1 | 2/2010 | Dongare |
| 2010/0099390 | A1* | 4/2010 | Vendrow et al. ........... 455/414.1 |
| 2010/0145476 | A1 | 6/2010 | Junk et al. |
| 2010/0190442 | A1 | 7/2010 | Citrano, III et al. |
| 2010/0290351 | A1* | 11/2010 | Toepke et al. ................. 370/250 |
| 2011/0068906 | A1 | 3/2011 | Shafer et al. |
| 2011/0187490 | A1 | 8/2011 | Nakamoto et al. |
| 2011/0228725 | A1 | 9/2011 | Nakamoto et al. |
| 2012/0041744 | A1 | 2/2012 | Kantzes et al. |
| 2012/0084400 | A1 | 4/2012 | Almadi et al. |
| 2012/0230446 | A1 | 9/2012 | Feng |
| 2012/0236768 | A1 | 9/2012 | Kolavennu et al. |
| 2012/0316686 | A1 | 12/2012 | Dueckman |

OTHER PUBLICATIONS

Office Action dated May 31, 2013 in connection with U.S. Appl. No. 13/331,638, 22 pages.

Office Action dated Aug. 15, 2013 in connection with U.S. Appl. No. 13/272,728, 17 pages.

Notification of Transmittal of the International Search Report and the Written Opinion of the International Searching Authority, or the Declaration dated Mar. 19, 2013 in connection with International Patent Application No. PCT/US2012/058620.

"3M Electronic Marker System (EMS) Ball Markers", 3M, 2013, Product information retrieved online Nov. 30, 2013, 2 pages.

"ISA100 Wireless Module", www.wihartsystems.com, retrieved from the internet on Jun. 15, 2012, 3 pages.

Derek Benz, "Industrial Wireless: Implementation Success Factors", Control Engineering Asia, Apr. 2009, 12 pages.

"UDC3500 Universal Digital Controller", Honeywell Process Solutions, Mar. 2007, 16 pages.

"Honeywell Announces New Infrared Technology Designed to Help Contractors Save Time and Money", News Release, AutomatedBuildings.com, Mar. 2006, 2 pages.

Frank Golatowski, et al., "Service-Oriented Software Architecture for Sensor Networks", 2003, 3 pages.

Robert Powell, "Method for Wirless Device Location Using Automatic Location Update Via a Provisioning Device and Related Apparatus and System", U.S. Appl. No. 13/272,728, filed Oct. 13, 2011.

European Search Report dated Aug. 12, 2014 in connection with European Application No. 12760615.0, 3 pages.

European Search Report dated Aug. 5, 2014 in connection with European Application No. 12760515.2, 3 pages.

Office Action dated Aug. 15, 2014 in connection with U.S. Appl. No. 13/331,638, 27 pages.

Communication Pursuant to Article 94(3) EPC dated Oct. 7, 2014 in connection with European Patent Application No. 12 760 515.2; 5 pages.

* cited by examiner

INTERFACE FOR LOCAL CONFIGURATION AND MONITORING OF AN INDUSTRIAL FIELD DEVICE WITH SUPPORT FOR PROVISIONING ONTO AN INDUSTRIAL WIRELESS NETWORK AND RELATED SYSTEM AND METHOD

CROSS-REFERENCE TO RELATED APPLICATION AND PRIORITY CLAIM

This application claims priority under 35 U.S.C. §119(e) to U.S. Provisional Patent Application No. 61/454,192 filed on Mar. 18, 2011, which is hereby incorporate by reference.

TECHNICAL FIELD

This disclosure relates generally to industrial control and automation systems. More specifically, this disclosure relates to an interface for local configuration and monitoring of an industrial field device with support for provisioning onto an industrial wireless network and related system and method.

BACKGROUND

Industrial control and automation systems are often used to automate large and complex industrial processes. These types of systems routinely include wireless networks that facilitate communications with a wide range of industrial field devices. The field devices can include wireless sensors, wireless actuators, and wireless controllers. One example wireless network protocol being developed is the ISA100.11a protocol A field device used in an ISA100.11a wireless network is typically required to have a local device interface that can be used to provide out-of-band (OOB) provisioning data to the field device. The provisioning process typically requires the use of a computer-based application (referred to as a "provisioning tool") that can transfer provisioning data to the field device. However, having to use this provisioning tool in addition to conventional configuration and monitor tools incurs additional complexity and cost for users.

SUMMARY

This disclosure provides an interface for local configuration and monitoring of an industrial field device with support for provisioning onto an industrial wireless network and related system and method.

In a first embodiment, a method includes communicatively coupling a user device to a field device in an industrial control system in order to configure and provision the field device. The method also includes selecting an operating mode of the user device. The method further includes, in response to selecting a first operating mode, providing configuration data from the user device to the field device in order to configure the field device. In addition, the method includes, in response to selecting a second operating mode, providing provisioning data from the user device to the field device in order to provision the field device onto a wireless network.

In a second embodiment, an apparatus includes an interface configured to communicate with a field device in an industrial control system. The apparatus also includes a controller configured in a first operating mode to initiate communication of configuration data to the field device in order to configure the field device. The controller is also configured in a second operating mode to initiate communication of provisioning data to the field device in order to provision the field device onto a wireless network.

In a third embodiment, a system includes a field device in an industrial control system and a user device configured to configure and provision the field device. The user device includes an interface configured to communicate with the field device. The user device also includes a controller configured in a first operating mode to initiate communication of configuration data to the field device in order to configure the field device. The controller is also configured in a second operating mode to initiate communication of provisioning data to the field device in order to provision the field device onto a wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
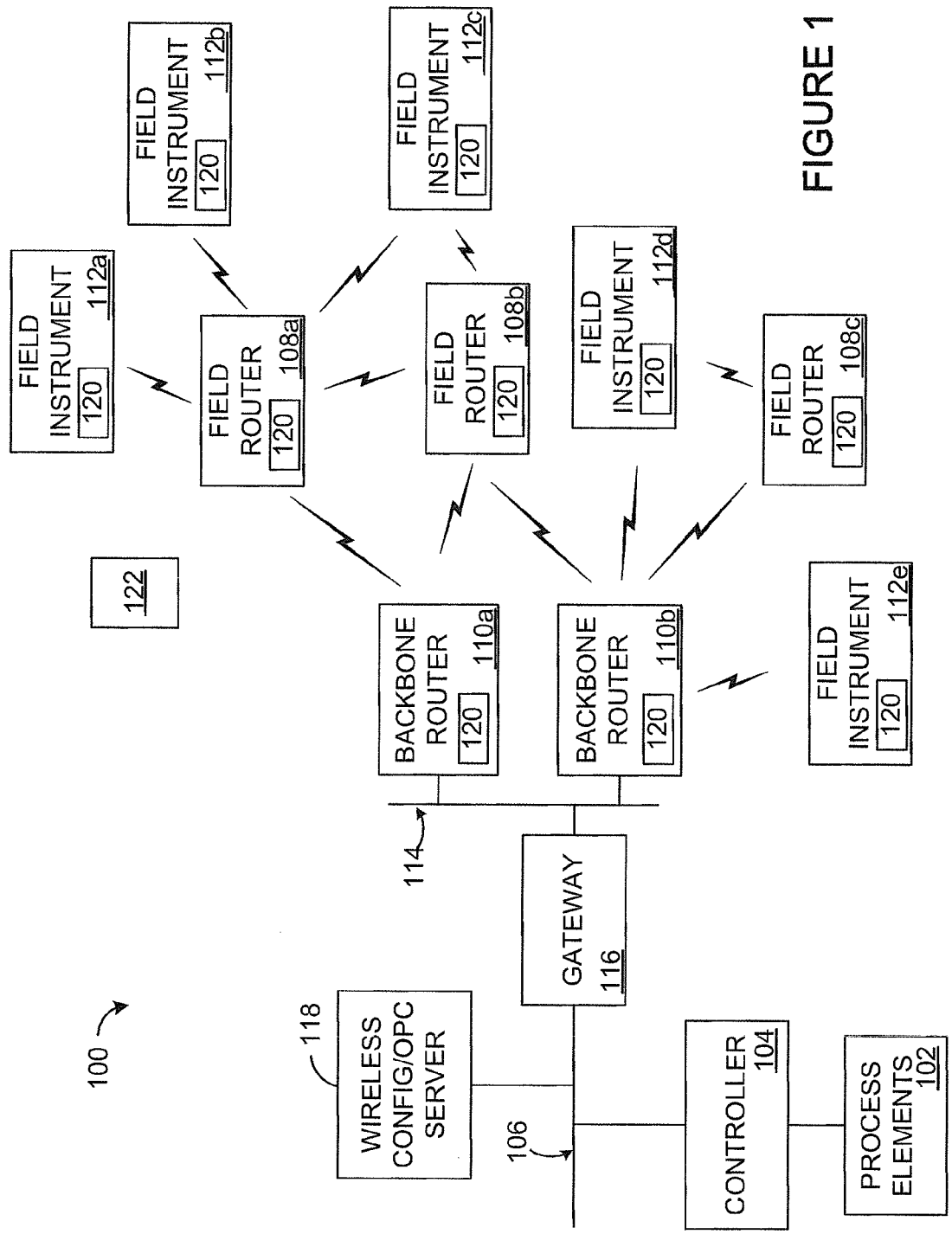
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100.11a.

In this example, the field routers 108a-108c and backbone routers 110a-110b generally represent routing devices that store and forward messages for other devices and that are typically line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and field instruments 112a-112e. The server 118 could also support security in the system 100, such as by distributing cryptographic keys or other security data to various wireless devices or other components. The server 118 includes any suitable structure for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multifunctional, plant-wide coverage for wireless sensing, asset location tracking, personnel tracking, wireless communications, and any other or additional functionality as desired.

In one aspect of operation, at least one field device (such as a router or field instrument) includes an interface 120 that supports both (i) local configuration and monitoring of the field device and (ii) provisioning of the field device onto the wireless network. The interface 120 can support out-of-band (OOB) communications, meaning the communications occur outside of the wireless network. The interface 120 can also support the local update of a foreign protocol device, such as a legacy protocol device. The interface 120 allows a user device 122, such as a personal digital assistant (PDA) or other handheld/portable device, to interact with the field device and to configure and monitor the field device, as well as to provision the field device onto the wireless network.

The interface 120 includes any suitable structure for communication with an external device to support local configuration and monitoring of a field device and provisioning of the field device onto a wireless network. For example, the interface 120 can facilitate the bridging, commissioning, or re-configuring of the Field Device in a hazardous environment present on the field with an intrinsically safe (IS) certified provisioning tool. In some embodiments, the interface 120 can be a self-contained adapter configured to provide a communication capability, such as wireless communication capability, to a legacy field device that previously was not equipped with the specified communication capability. For example, the interface 120 can be a one-wireless-adapter (OWA) that can provide a wireless communication capability to the legacy field device, which may have been constructed prior to or without the specified wireless capability. The interface 120 could also use any suitable technology to communicate with an external device. For instance, the interface 120 could represent an infrared interface, a radio interface, or other wireless interface or a wired interface.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where an interface 120 supporting both configuration/monitoring of a field device and provisioning of the field device onto a wireless network can be used. This functionality could be used in any other suitable system.

Figure 2A:
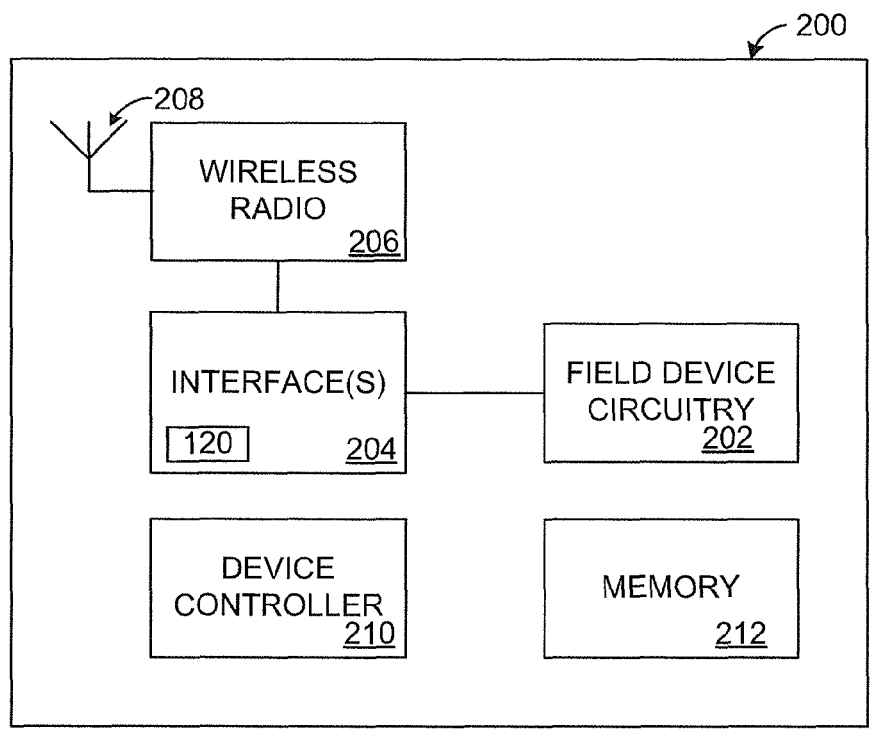
FIGS. 2A and 2B illustrate an example field device and an example provisioning device containing interfaces supporting configuration and monitoring of the field device and provisioning of the field device onto a wireless network according to this disclosure.
Figure 2B:
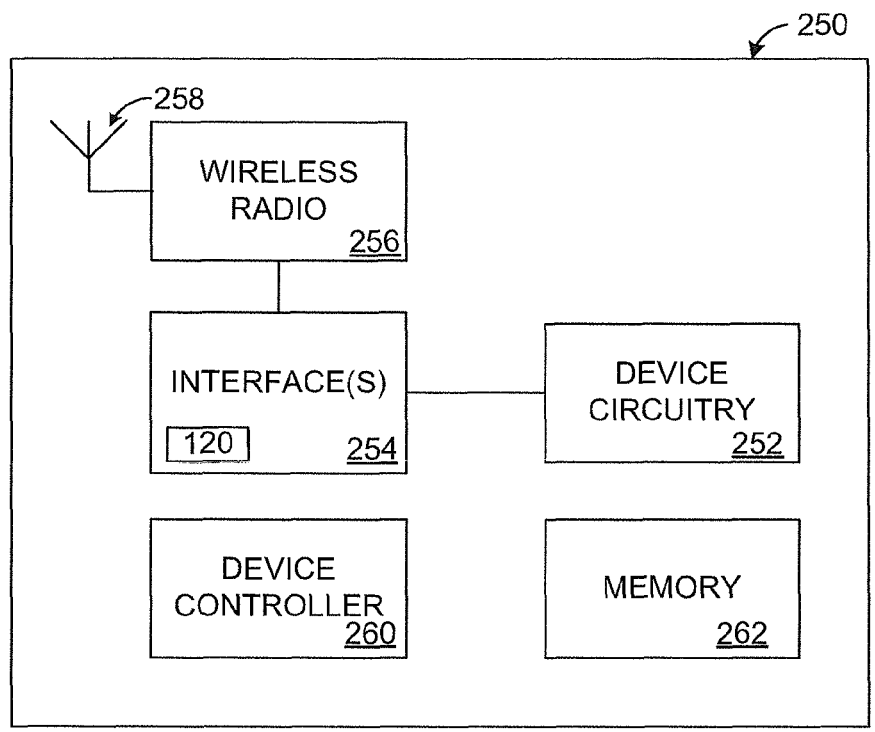

FIGS. 2A and 2B illustrate an example field device 200 and an example user device 250 containing interfaces supporting configuration and monitoring of the field device and provisioning of the field device onto a wireless network according to this disclosure. The field device 200 and the user device 250 could be used in the system 100 of FIG. 1 or in any other suitable system.

As shown in FIG. 2A, the field device 200 includes field device circuitry 202. The circuitry 202 generally performs the industrial control/automation function(s) of the field device 200. For example, the circuitry 202 could include sensing and signal processing circuitry within an industrial process sensor. The circuitry 202 could also include actuating circuitry for making adjustments to an industrial process within an industrial actuator. The circuitry 202 could further include processing circuitry for determining how to adjust an industrial process within a process controller. Any other or additional circuitry 202 supporting any other or additional functions could be used in the field device 200.

The field device 200 also includes at least one interface 204, a wireless radio 206, and an antenna 208. The interface 204 supports communications between the field device circuitry 202 and the wireless radio 206. The interface 204 could, for example, retrieve outgoing data to be transmitted wirelessly from the circuitry 202 and provide that data to the wireless radio 206. The interface 204 could also provide incoming data received wirelessly from the wireless radio 206 to the circuitry 202. The interface 204 includes any suitable structure for supporting communications of data between components. In particular embodiments, the interface 204 could support any suitable protocol for interacting with a field device, such as the highway addressable remote transducer (HART) or Modbus based protocol. In other embodiments, the interface 204 includes a generalized American Standard Code for Information Interchange (ASCII) based serial interface. Note that any other suitable interface(s) could be used, depending on the industrial field device protocol(s) used by the field device.

The wireless radio 206 and the antenna 208 can be used to communicate wirelessly with other devices (such as routers) in a wireless network. The wireless radio 206 supports the necessary protocol(s) for communicating over an industrial wireless network. The wireless radio 206 includes any suitable structure for providing signals for wireless transmission and/or for obtaining signals received wirelessly. The antenna 208 represents any suitable structure for transmitting and/or receiving wireless signals. In some embodiments, the wireless radio 206 represents an RF transceiver, such as an RF FHSS or DSSS transceiver. As a particular example, the wireless radio 206 could be implemented using a FREESCALE or MSP430 processor. Also, the antenna 208 could represent an RF antenna. Note that any other suitable wireless signals could be used to communicate and that the wireless radio could include a transmitter and a separate receiver.

In some embodiments, the field device 200 is a legacy device that was previously not equipped with a wireless capability. One or more of the interface 204, wireless radio 206, and antenna 208 can be added to the field device 200, such as after installation of the field device 200. However, the configuration and monitoring of the industrial field device could be performed by utilizing an application protocol that provides configuration and monitor of the industrial field device data but does not provide sufficient considerations for data transport over a wireless wide area network. Specifically, the industrial field devices native protocol may not contain any provisions for data security, network address assignment, packet routing, or other features required to support a network connection.

The field device 200 further includes a controller 210, which controls the overall operation of the device 200. For example, the controller 210 could control the communication of data to and from the wireless radio 204. The controller 210 could also control the process control/automation functionality performed by the field device 200. In addition, the controller 210 could execute the functionality associated with HART interface objects or interface objects for other field device protocols as described below. The controller 210 includes any suitable structure for controlling operation of a field device. As particular examples, the controller 210 could represent a processor, microprocessor, microcontroller, field programmable gate array, digital signal processor, or other processing or control device(s).

A memory 212 is coupled to the controller 210. The memory 212 stores any of a wide variety of information used, collected, or generated by the field device 200. For example, the memory 212 could store information transmitted over or received from a wireless network. The memory 212 includes any suitable volatile and/or non-volatile storage and retrieval device(s).

As described above, an interface 120 can be implemented within a field device to support both the configuration/monitoring of the field device and provisioning of the field device onto a wireless network where the wireless network configuration is not available as a feature of the configuration of the field device. In addition, the interface 120 can facilitate the bridging, commissioning or re-configuring of the Field Device in a hazardous environment present on the field with an IS certified provisioning tool. In this example, the interface 120 forms part of the interface 204. For example, an infrared interface could be a component part of an interface processor board (interface 204) that converts ISA100.11a network packets sent to and received from an ISA100.11a radio board (wireless radio 206) into HART, Modbus, or other industrial protocol application packets. The HART, Modbus or other industrial protocol application packets can be sent to and received from ISA100.11a-based "interface objects" contained within a user application process (UAP) software application located on the interface board. The interface objects provide access to a HART-based or other protocol-based application, either directly or by use of a modem or other circuitry. By supporting this local OOB interface 120, a user that is local to the field device 200 can send packets either to provisioning objects located on the radio board or to the field device circuitry by means of the interface objects. Effectively, the interface objects can be used to route incoming data to provisioning functionality or device configuration/monitoring functionality, where a single tool can be used for both functions.

A field device 200 on a standard wired HART interface is often limited to (i) a query/response mechanism using HART-based commands and (ii) an unsolicited response mode transmission referred to as HART burst mode where the field device periodically sends process data at a predetermined update rate. These communication methods were designed and optimized for data transfer over a two-wire master/slave communication interface. The HART-based protocol did not consider transport or network services and, in many cases, combined application layer features to control physical layer aspects. As a result, simply encapsulating a HART protocol into the ISA100.11a protocol does not achieve desired addressing, efficiency, and functionality for a distributed wireless network.

By using an interface object to interface a HART field device into a wireless network, the HART field device can be provided with any desired or necessary ISA100.11a features and services for network communications. These features and services can include the ability of the interface to be identified as a standard ISA100.11a addressable object with standard ISA100.11a application services of read, write, publish, subscribe, and method execution.

In some embodiments, a handheld device, such as a user device 122, can be communicatively (and possibly physically) connected to the interface 120 in order to access interface objects using ISA100.11a services. This can be done to invoke specific functions exposed by a HART proxy host application executing in the field device 200. These functions can include open, send, receive, and close.

The open function can instruct the HART application associated with the selected interface to prepare the HART interface for communication. This may include checking that a HART device is connected and determining the unique identifier for data transactions. The send operation can instruct the application associated with the selected interface to send a specific command to the connected HART device. The send operation could be blocking (where it waits for a response before returning) or non-blocking (where it returns with an acknowledgement that the command was successfully sent and the response can be returned by polling with a receive operation). The close operation can instruct the application associated with the selected interface to terminate communication with the field device and possibly put the interface in a low power state. By use of these exposed functions, an application running in a provisioning or other device can utilize the interface object as a remote modem interface to send and receive without the need to be concerned with HART protocol features such as preambles, bus arbitration, device discovery, and other data and physical layer features. In this way, the HART protocol is not used over the interface 120, but instead only the HART commands and HART response data are transferred by using ISA100.11a standard services via the functions and attributes exposed by the interface objects.

In FIG. 2B, the user device 250 can contain applications supporting both configuration/monitoring of a field device and provisioning of the field device onto a wireless network. For example, the user device 250 can bridge, commission, or re-configure the field device 200 in a hazardous environment present on the field. The user device 250 can be a PDA, personal computer (PC), mobile terminal, or other handheld/portable device.

As shown in FIG. 2B, the user device 250 includes device circuitry 252. The circuitry 252 generally performs the configuration or monitoring operations associated with a field device, as well as provisioning operations associated with the field device, such as when the provisioning data is not available or included in the configuration data for configuration of the field device. Any other or additional circuitry 252 supporting any other or additional functions could be used in the user device 250.

The user device 250 also includes at least one interface 254, a wireless radio 256, and an antenna 258. The interface 254 supports communications between the field device circuitry 252 and the wireless radio 256. The interface 254 could, for example, retrieve outgoing data to be transmitted wirelessly from the circuitry 252 and provide that data to the wireless radio 256. The interface 254 could also provide incoming data received wirelessly from the wireless radio 256 to the circuitry 252. The interface 254 includes any suitable structure for supporting communications of data between components. In particular embodiments, the interface 254 could support any suitable protocol for interacting with a field device, such as the HART or W-HART protocol. In other embodiments, the interface 254 includes a serial interface. Note that any other suitable interface(s) could be used, depending on the industrial field device protocol(s) used by the field device.

The wireless radio 256 and the antenna 258 can be used to communicate wirelessly with other devices (such as routers) in a wireless network. The wireless radio 256 supports the necessary protocol(s) for communicating over an industrial wireless network. The wireless radio 256 includes any suitable structure for providing signals for wireless transmission and/or for obtaining signals received wirelessly. The antenna 258 represents any suitable structure for transmitting and/or receiving wireless signals. In some embodiments, the wireless radio 256 represents an RF transceiver, such as an RF FHSS or DSSS transceiver. As a particular example, the wireless radio 256 could be implemented using a FREESCALE or MSP430 processor. Also, the antenna 258 could represent an RF antenna. Note that any other suitable wireless signals could be used to communicate and that the wireless radio could include a transmitter and a separate receiver.

The user device 250 further includes a controller 260, which controls the overall operation of the user device 250. For example, the controller 260 could control the communication of data to and from the wireless radio 254. The controller 260 could also cause the user device 250 to operate in a selected operating mode (such as configuration or provisioning mode). The controller 260 can execute a number of applications stored on the user device 250. For instance, the controller 260 could execute a first application for configuring/monitoring the field device 200 and a second application for provisioning the field device 200 onto the wireless network. For example, the second application for provisioning the field device can be used when the provisioning data is not available or included in the configuration data for configuration of the field device. The controller 260 includes any suitable structure for controlling operation of a provisioning device. As particular examples, the controller 260 could represent a processor, microprocessor, microcontroller, field programmable gate array, digital signal processor, or other processing or control device(s).

A memory 262 is coupled to the controller 260. The memory 262 stores any of a wide variety of information used, collected, or generated by the user device 250. For example, the memory 262 could store a plurality of applications for use by the user device 250, including applications related to the configuration/monitoring of the field device 200 and applications related to provisioning the field device 200 onto a wireless network. The memory 262 includes any suitable volatile and/or non-volatile storage and retrieval device(s).

As described above, using the user device 250 and a local OOB interface 120, a user that is local to the field device 200 can send packets to provisioning objects located on the radio board of the field device 200 or to the field device circuitry by means of the interface objects. Effectively, the interface objects can be used to route data to device configuration/monitoring functionality or provisioning functionality, where a single user device 250 can be used for both functions. This allows the hand held configuration tool to utilize existing methods and tools for configuration of the field device application without regard for the requirements for access over the wireless network.

In some embodiments, the user device 250 can be communicatively (and possibly physically) connected to the interface 120 in order to access interface objects of the field device 200 using ISA100.11a services. This can be done to invoke specific functions exposed by a HART proxy host application executing in the field device 200. These functions can include open, send, receive, and close.

The configuration and monitor of the field device with the user device 250 (e.g., hand held tool) is enabled by the use of out of band access. This enables local access to the field device application without requiring any consideration for wireless or network attributes including network address or data encryption. Also the use of out of band access restricts the configuration and monitor of the field device to only access the field device that is it is connected to either via IR or a wired interface and prevents access to other field devices or any interference on the wireless network.

The provisioning of the field device 200 onto the wireless network is independent of the protocol and methods used for configuration and monitor of the field device application. This feature allows the provisioning of the device by the user device 250 to be common to any user application protocol. As such, a user device 250 can include common security and network management features while also providing multiple field device monitor and configuration applications that may be specifically designed for various field device application protocols (Modbus, HART, Fieldbus, ASCII, Vendor specific, and the like.) When connected on a wireless network, a network manager can restrict out of band access at the field device 200 in order to prevent unwanted configuration or monitoring of the field device 200 by use of the hand held configuration tool without network authorization.

Although FIGS. 2A and 2B illustrate examples of a field device 200 and a user device 250, various changes may be made to FIGS. 2A and 2B. For example, the field device 200 and the user device 250 could each include any number of its various components. Also, the functional divisions shown in FIGS. 2A and 2B are for illustration only. Various components in FIG. 2A or FIG. 2B could be combined, subdivided, or omitted and additional components could be added according to particular needs.

Figure 3:
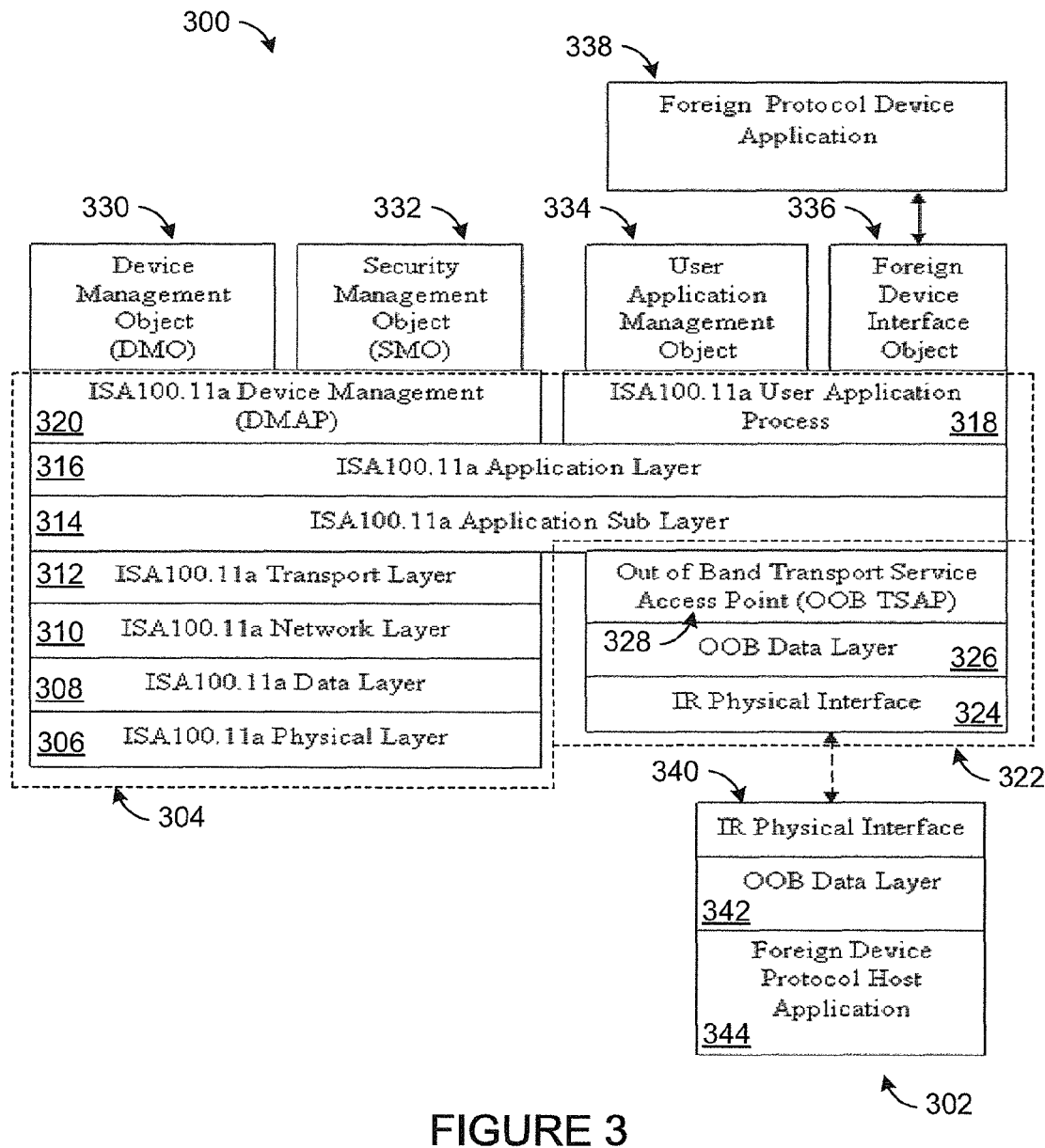
FIG. 3 illustrates example protocol stacks in a field device and a provisioning device in an industrial control and automation system according to this disclosure.

FIG. 3 illustrates example protocol stacks in a field device 200 and a user device 250 in an industrial control and automation system according to this disclosure. In particular, FIG. 3 illustrates example protocol stacks supporting the use of the ISA100.11a protocol and an infrared out-of-band interface. These protocol stacks can vary depending on the in-band and out-of-band communication mechanisms used. In this example, the protocol stack represents an ISA100.11a protocol stack for HART field device data access. Of course, the interface object extension to the ISA100.11a stack can be implemented using other field device command processors.

As shown in FIG. 3, a protocol stack 300 is associated with the field device 200, and a protocol stack 302 is associated with the user device 250. In some embodiments, when the interface 120 is an adapter such as an OWA coupled to the field device 200, the protocol stack 300 is associated with the adapter.

In this example, the protocol stack 300 includes various layers 304 supporting the ISA100.11a protocol. The layers 304 include a physical layer 306, a data layer 308, a network layer 310, and a transport layer 312 (which could support the standard OSI model functions). The layers 304 also include an application sub-layer 314, an application layer 316, and a user application process layer 318. The application sub-layer 314 provides a level of abstraction by making it unnecessary for higher layers to know what types of services are available at the transport level and the extent of services available at that level. The application layer 316 executes various applications that communicate with each other and with lower layers via the application sub-layer 314. The user application process layer 318 provides an additional layer for higher-level applications. The layers 304 further include a device management application process (DMAP) layer 320, which manages local communication aspects of the field device 200 and sets up connections for the layer 314.

The protocol stack 300 also includes various layers 322 supporting out-of-band communications. In this example, the layers 322 include an infrared physical interface layer 324 and an OOB data layer 326. The layer 324 supports the use of a physical infrared receiving device. The layers 322 also include an OOB transport service access point (TSAP) layer 328.

The protocol stack 300 further includes various objects for managing different aspects of the field device 200. For example, objects 330-334 are used to manage the field device 200, security for the field device 200, and user applications executed by the field device 200, respectively. Also, a foreign device interface object 336 facilitates use of a foreign protocol device application 338 in the field device 200. Here, the OOB communication interface to the application sub-layer 314 allows local access to both native objects and non-ISA100.11a protocol applications by use of the foreign device interface object 336. The OOB TSAP layer 328 provides packet notation to limit access as required by the field device 200 for local operations. In some embodiments, OOB packets do not contain network address fields and are inherently restricted by the OOB data layer 326 for local access.

The protocol stack 302 here includes an infrared physical layer 340, an OOB data layer 342, and a foreign device protocol host application 344. The host application 344 generally denotes an application that uses an OOB foreign protocol to communicate with the foreign protocol device application 338 in the field device 200. Thus, the host application 344 is able to provide provisioning and configuration/monitoring information to the field device 200. For example, the user device 250 can include applications for configuring the field device 200 as well as applications for provisioning the field device 200 onto a wireless network. A user that is local to the field device 200 can use the configuration application on the user device 250 to configure the field device 200 via the interface 120. The user can then access the provisioning application on the user device 250 to provision the field device 200 to operate on a wireless network.

Although FIG. 3 illustrates examples of protocol stacks 300-302 in a field device 200 and a user device 250 in an industrial control and automation system, various changes may be made to FIG. 3. For example, as noted above, the use of ISA100.11a and OOB infrared communications are examples only. Also, any other or additional layers could be used in the field device 200 and the user device 250 to support the various functions of the field device 200 and the user device 250.

Figure 4:
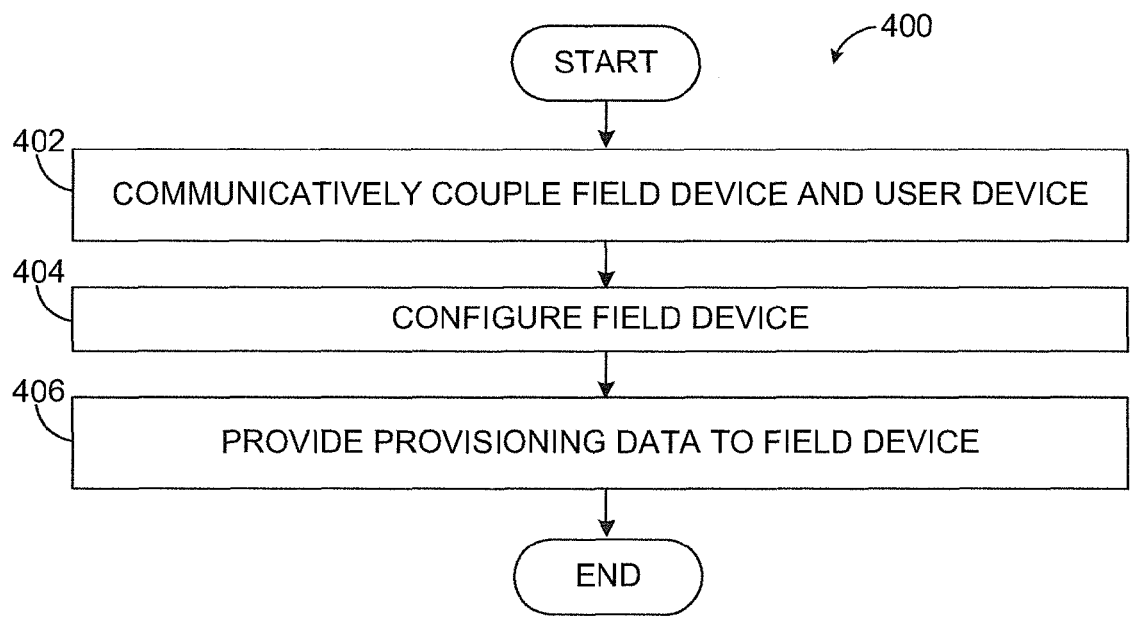
FIG. 4 illustrates an example method for configuring and provisioning a field device via a provisioning device according to this disclosure.

FIG. 4 illustrates an example method 400 for configuring and provisioning a field device 200 via a user device 250 according to this disclosure. As shown in FIG. 4, a field device is communicatively coupled to a provisioning device at step 402. This could include, for example, physically coupling the user device 250 to the field device 200 using a wired interface 120. This could also include initiating an infrared or other wireless communication session between the user device 250 and the field device 200 using a wireless interface 120. This could further include coupling an adapter, such as an OWA, to the field device 200 in order to enable wireless communications with the field device 200.

The field device is configured at step 404. This could include, for example, an operator selecting an operating mode, such as a configuration mode, of the user device 250. Selection of the configuration mode can include accessing a configuration application stored on the user device 250, such as in the memory 262. The user device 250, running the configuration application, configures the field device 200 to perform specified functions. Additionally, the user device 250, running the configuration application or other application, can monitor functions or other aspects of the field device 200.

Provisioning data is provided to the field device at step 406. This could include, for example, the operator selecting an operating mode, such as a provisioning mode, of the user device 250. Selection of the provisioning mode can include selecting a provisioning application stored on the user device 250, such as in the memory 262. When running the provisioning application, the user device 250 communicates provisioning data, such as a wireless network identifier and wireless security credentials, to the field device 200. As part of the provisioning, the user device 250 may or may not communicate the identified location to the field device 200.

Although FIG. 4 illustrates one example of a method 400 for configuring and provisioning a field device 200 via a user device 250, various changes may be made to FIG. 4. For example, while shown as a series of steps, various steps in FIG. 4 could overlap, occur in parallel, occur multiple times, or occur in a different order.

Figure 5:
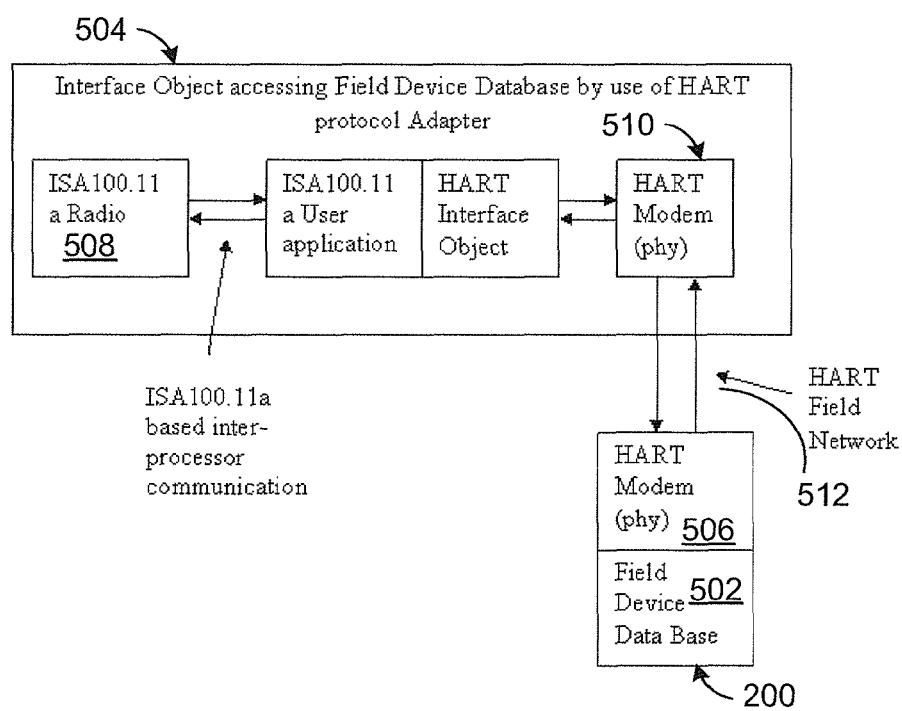
FIGS. 5 through 7 illustrate example techniques for accessing data from a field device using a HART® command set according to this disclosure.
Figure 6:
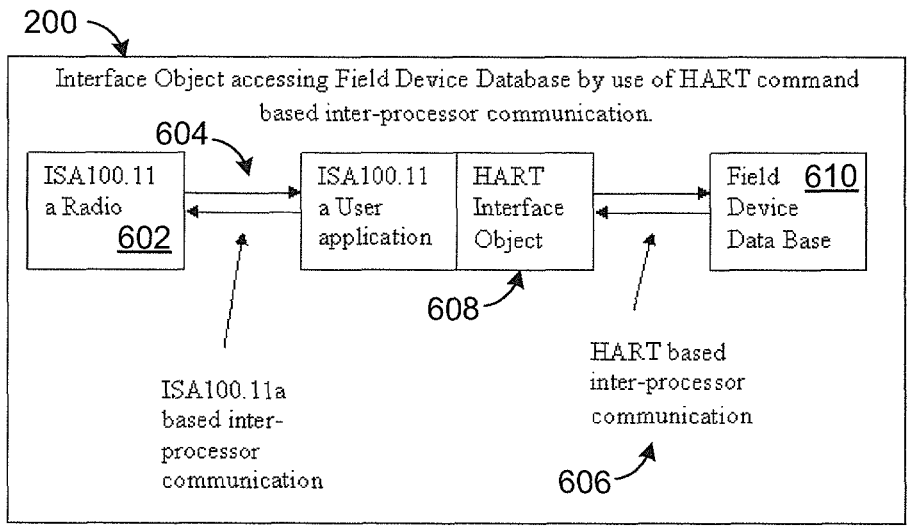
Figure 7:
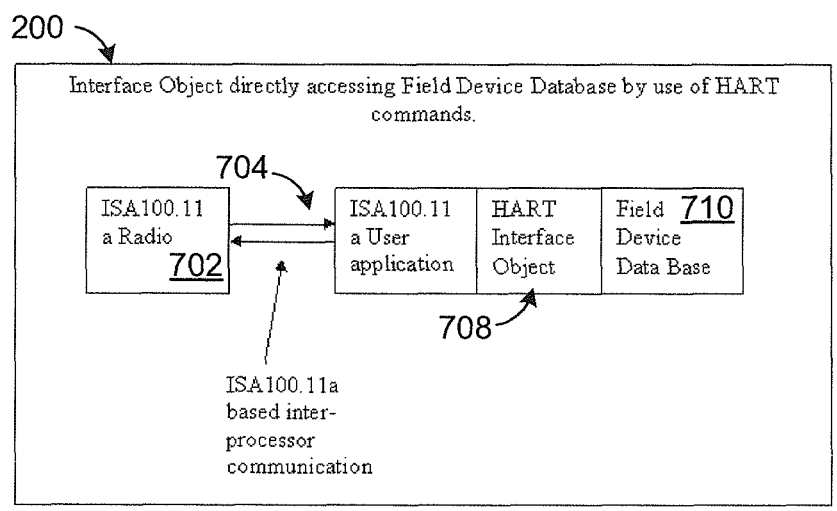

FIGS. 5 through 7 illustrate example techniques for accessing data from a field device 200 using a HART command set according to this disclosure. Note that other field device protocols could be supported by the field device 200.

In the example illustrated in FIG. 5, an interface object accesses a field device database 502 by use of a HART protocol adapter 504. The adapter 504 is configured to provide a wireless communication capability to the field device 200. In this example, the field device 200 includes a HART modem 506, and the adapter 504 includes a radio 508 and a HART modem 510. The adapter 504 can be coupled to the field device 200 via a HART field network 512 established between the HART modems 506 and 508.

In the example illustrated in FIG. 6, an interface object accesses a field device database 610 using inter-processor communications. The communications can be HART-based or based on any other suitable protocol. In FIG. 6, the field device 200 includes a radio capability provided by a radio 602. ISA100.11a communications 604 are based on the inter-processor communications. In addition, a communication link between a HART interface object 608 and the field device database 610 can be based on the inter-processor communications.

In the example illustrated in FIG. 7, an interface object accesses a field device database 710 using HART commands. In FIG. 7, the field device 200 includes a radio capability provided by a radio 702. ISA100.11a communications 704 are based on the inter-processor communications. However, a HART interface object 708 can access the field device database 710 via HART-based commands, without the need for a physical connection as shown in the example of FIG. 5 and without inter-processor communications as shown in the example of FIG. 6.

Using these techniques, existing HART-based or other field devices can be efficiently evolved to ISA100.11a or other wireless devices. This promotes the use of the ISA100.11a or other wireless standard in existing industrial facilities and with field devices manufactured without wireless capabilities.

Although FIGS. 5 through 7 illustrate examples of techniques for accessing data from a field device using a HART command set, various changes may be made to FIGS. 5 through 7. For example, the interface 120 could be used to support both configuration/monitoring of a field device and provisioning of the field device onto a wireless network in any other suitable manner.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
communicatively coupling a user device to a field device in an industrial control system to configure and provision the field device, wherein the user device is communicatively coupled to the field device using out of band access;
selecting an operating mode of the user device;
in response to selecting a first operating mode, providing configuration data from the user device to the field device using the out of band access to configure the field device; and
in response to selecting a second operating mode, providing provisioning data from the user device to the field device using the out of band access to provision the field device onto a wireless network;
wherein the out of band access to the field device is restricted by a network manager after the field device is connected to the wireless network to prevent unwanted configuration or monitoring of the field device by the user device without network authorization.

2. The method of claim 1, wherein the field device is coupled to an adapter that is configured to provide a wireless communication capability to the field device.

3. The method of claim 1, wherein selecting the operating mode comprises selecting one of multiple applications executed by the user device.

4. The method of claim 3, wherein the applications comprise a configuration application and a provisioning application.

5. The method of claim 4, wherein:
the first operating mode is selected in response to invoking execution of the configuration application; and
the second operating mode is selected in response to invoking execution of the provisioning application.

6. The method of claim 1, wherein providing the configuration data and providing the provisioning data comprise:
communicating the provisioning data and the configuration data to the field device through an out-of-band communication interface.

7. The method of claim 6, wherein the out-of-band communication interface comprises one of: a direct wired interface and an infrared interface.

8. An apparatus comprising:
an interface configured to communicate with a field device in an industrial control system, wherein the interface is configured to communicate with the field device using out of band access; and
a controller configured to:
in a first operating mode, initiate communication of configuration data to the field device using the out of band access to configure the field device; and
in a second operating mode, initiate communication of provisioning data to the field device using the out of band access to provision the field device onto a wireless network;
wherein the out of band access to the field device is restricted by a network manager after the field device is connected to the wireless network to prevent unwanted configuration or monitoring of the field device by the apparatus without network authorization.

9. The apparatus of claim 8, wherein the interface is configured to communicate with an adapter coupled to the field device, the adapter configured to provide a wireless communication capability to the field device.

10. The apparatus of claim 8, wherein the controller is configured to select one of the operating modes by selecting one of multiple applications for execution.

11. The apparatus of claim 10, wherein the applications comprise a configuration application and a provisioning application.

12. The apparatus of claim 11, wherein:
the controller is configured to select the first operating mode in response to invoking execution of the configuration application; and
the controller is configured to select the second operating mode in response to invoking execution of the provisioning application.

13. The apparatus of claim 8, wherein the interface comprises an out-of-band communication interface.

14. The apparatus of claim 13, wherein the out-of-band communication interface comprises one of: a direct wired interface and an infrared interface.

15. The apparatus of claim 8, wherein the controller is configured to execute at least one field device protocol interface object that interfaces the field device to the wireless network.

16. A system comprising:
a field device in an industrial control system; and
a user device configured to configure and provision the field device, the user device comprising:
an interface configured to communicate with the field device, wherein the interface is configured to communicate with the field device using out of band access; and
a controller configured to:
in a first operating mode, communication of configuration data to the field device using the out of band access to configure the field device; and
in a second operating mode, initiate communication of provisioning data to the field device using the out of band access to provision the field device onto a wireless network;
wherein the out of band access to the field device is restricted by a network manager after the field device is connected to the wireless network to prevent unwanted configuration or monitoring of the field device by the user device without network authorization.

17. The system of claim 16, wherein the field device is coupled to an adapter that is configured to provide a wireless communication capability to the field device.

18. The system of claim 16, wherein the controller is configured to select one of the operating modes by selecting one of multiple applications for execution.

19. The system of claim 18, wherein:
the applications comprise a configuration application and a provisioning application;
the controller is configured to select the first operating mode in response to invoking execution of the configuration application; and
the controller is configured to select the second operating mode in response to invoking execution of the provisioning application.

20. The system of claim 16, wherein the interface comprises an out-of-band communication interface, the out-of-band communication interface comprising one of: a direct wired interface and an infrared interface.

21. The method of claim 1, wherein:
the user device executes multiple configuration applications operable to configure different types of field devices using different field device application protocols; and
provisioning the field device onto the wireless network is independent of one or more protocols or methods used by a specified one of the configuration applications to configure the field device.

22. The method of claim 1, wherein selecting the operating mode comprises receiving a selection of the operating mode from a user.

23. A method comprising:
communicatively coupling a field device in an industrial control system to a user device, wherein the field device is communicatively coupled to the user device using out of band access;
when the user device is operating in a first operating mode, receiving configuration data from the user device at the field device using the out of band access to configure the field device; and
when the user device is operating in a second operating mode, receiving provisioning data from the user device at the field device using the out of band access to provision the field device onto a wireless network;
wherein the out of band access to the field device is restricted by a network manager after the field device is connected to the wireless network to prevent unwanted configuration or monitoring of the field device by the user device without network authorization.

24. The method of claim 23, wherein the field device comprises at least one of a sensor and an actuator in the industrial control system.

25. An apparatus comprising a field device that includes:
an interface configured to communicate with a user device in an industrial control system, wherein the interface is configured to communicate with the user device using out of band access; and
a controller configured to:
when the user device is operating in a first operating mode, receive configuration data from the user device using the out of band access to configure the field device; and
when the user device is operating in a second operating mode, receive provisioning data from the user device using the out of band access to provision the field device onto a wireless network;
wherein the out of band access to the field device is restricted by a network manager after the field device is connected to the wireless network to prevent unwanted configuration or monitoring of the field device by the user device without network authorization.

26. The apparatus of claim 25, wherein the field device further comprises:
circuitry configured to perform at least one industrial control or automation function in the industrial control system.

* * * * *